United States Patent [19]
Schelkmann

[11] 3,904,459
[45] Sept. 9, 1975

[54] METHOD OF RETREADING TIRES

[75] Inventor: Wilhelm Schelkmann, Witten, Germany

[73] Assignee: Vakuum Vulk Holdings Ltd., Nassau, Bahamas

[22] Filed: Sept. 11, 1972

[21] Appl. No.: 288,002

[30] Foreign Application Priority Data
Sept. 11, 1971   Germany............................ 2145574

[52] U.S. Cl.......... 156/96; 156/128 R; 156/394 FM
[51] Int. Cl.².......................................... B29H 17/36
[58] Field of Search.......... 156/96, 126, 127, 128 R, 156/128 I, 128 T, 129, 130, 408, 409, 410, 411, 421

[56] References Cited
UNITED STATES PATENTS

| | | | |
|---|---|---|---|
| 1,220,178 | 3/1917 | Brucker............................... | 156/421 |
| 1,226,236 | 5/1917 | Meyer et al...................... | 156/128 R |
| 1,483,297 | 2/1924 | Gilson................................. | 156/411 |
| 1,488,343 | 3/1924 | Hoffman............................ | 156/128 I |
| 1,579,641 | 4/1926 | Burdette............................. | 156/96 |
| 1,718,633 | 6/1929 | Cardarelli et al.................. | 156/410 |
| 1,917,261 | 7/1933 | Hawkinson ........................ | 156/96 |
| 2,292,286 | 8/1942 | Owen.................................. | 156/96 |
| 2,971,563 | 2/1961 | Cahill................................. | 156/411 |
| 3,136,673 | 6/1964 | Carver................................. | 156/96 |
| 3,236,709 | 2/1966 | Carver................................. | 156/96 |
| 3,738,893 | 6/1973 | Edler.................................. | 156/394 |

*Primary Examiner*—Clifton B. Cosby
*Attorney, Agent, or Firm*—Michael S. Striker

[57] ABSTRACT

A tread strip is positioned in proximity to the outer periphery of a tire carcass. A bonding substance is provided intermediate the carcass and the strip and has adhesive characteristics sufficient to temporarily bond the strip to the carcass when the strip and carcass are pressed together. The bonding substance is also sufficiently plastic to result in intimate contact by the substance of the facing surfaces of the strip and the carcass when the strip and carcass are pressed together. The bonding substance, for example unvulcanized rubber, is capable of permanently bonding the strip to the carcass when the bonding substance is sufficiently heated. Initially, the strip and carcass are pressed together in such a manner as to expel gases from between the strip and carcass and in such a manner as to cause the bonding substance to temporarily bond the strip to the carcass. The bonding substance is heated to a temperature resulting in permanent bonding of the strip to the carcass, and during the heating step, escape of the bonding substance from between the strip and the carcass is prevented.

14 Claims, 8 Drawing Figures

JET OF HEATING FLUID

EVACUATION JACKET

PNEUMATICALLY OR HYDRAULICALLY INFLATED INNER TUBE

METHOD OF RETREADING TIRES

BACKGROUND OF THE INVENTION

The invention relates to the retreading of worn tire carcasses.

More particularly the invention relates to methods for retreading worn tires, of the type wherein a strip of vulcanized tread material is wrapped around a carcass and bonded to the outer periphery of the carcass by means of an intermediate bonding layer.

It is already known to wrap a vulcanized tread strip around the outer periphery of a tire carcass, with a layer of bonding material sandwiched between the carcass and the tread strip. In one such method the carcass, bonding material, and new tread material are wrapped tightly in a casing, and any air trapped between the elements is forced out by means of a strong vacuum. The tightly wrapped carcass, bonding material and new tread material are then heated in an autoclave to the vulcanization temperature of the bonding layer, to effect a permanent bonding of the new tread material to the old carcass.

Another method is known for eliminating air or other gaseous substances from between the old carcass and the new tread material. In that method a circumferentially complete ring of new tread material is stretched to enlarge its circumference and is located concentric to the tire carcass in a sealed chamber. The air is evacuated from the chamber and, in such a vacuum, the stretched ring of tread material is released and permitted to contract upon the carcass. Thereafter, the tread material and carcass are bonded by the conventional vulcanizing method.

Whereas these known methods do accomplish, more or less successfully, the evacuation of air and other gases from between the carcass and new tread material, they leave much to be desired in terms of convenience and simplicity. It is particularly disagreeable to retread tires when each and every tire must be enclosed in a sealed jacket from which the air is then evacuated. These processing steps are cumbersome as such and must in addition be very carefully performed, inasmuch as the presence of air between the carcass and the new tread material very detrimentally effects the resulting bond and the effectiveness and safety of the retreaded tire.

SUMMARY OF THE INVENTION

It is the general object of the present invention to overcome the disadvantages of prior-art tire retreading methods.

It is a more particular object to provide a simpler tire-retreading method.

It is a still further object to remove air from between the carcass and the new tread material in a manner far simpler than known hitherto.

It is a concomitant object to remove air from between the carcass and the new tread material without the necessity of suction devices.

It is a related object to remove air from between the carcass and the new tread material without the necessity of encasing the retreaded tire in an air-tight jacket prior to vulcanization.

These objects, and others which will become more understandable below, can be met by a retreading method wherein a tread strip is positioned in proximity to the outer periphery of a tire carcass. A layer of bonding substance is provided intermediate the carcass and the strip. The bonding substance is sufficiently adhesive to temporarily bond the tread strip to the carcass when the strip and carcass are pressed together. Also, the bonding substance is sufficiently plastic to intimately contact the facing surfaces of the tread strip and carcass when the strip and carcass are pressed together. The bonding substance, which for example may be unvulcanized rubber, is capable when sufficiently heated of permanently bonding the strip to the carcass. Initially, the strip and the carcass are pressed together in such a manner as to expel gases from between them and in such a manner as to cause temporary bonding of the strip to the carcass. The bonding substance is heated to a temperature resulting in permanent bonding of the strip to the carcass, and during such heating care is taken to prevent the escape of bonding substance from between the strip and the carcass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 4:
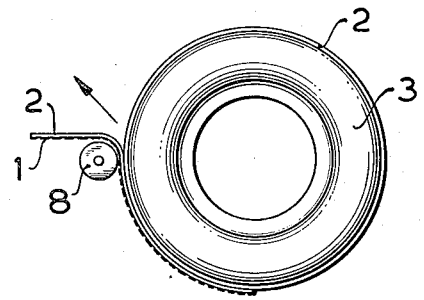
FIG. 4 illustrates somewhat schematically one way in which a strip of new tread material can be wrapped around the carcass.

FIG. 4 is a somewhat schematic diagram illustrating one manner of applying tread strips to the outer surfaces of tire carcasses, namely by rolling an elongated tread strip onto the outer surface of the carcass. However, it is also possible to apply to the carcasses circumferentially complete tread-strip rings in ways already known.

Figure 5:
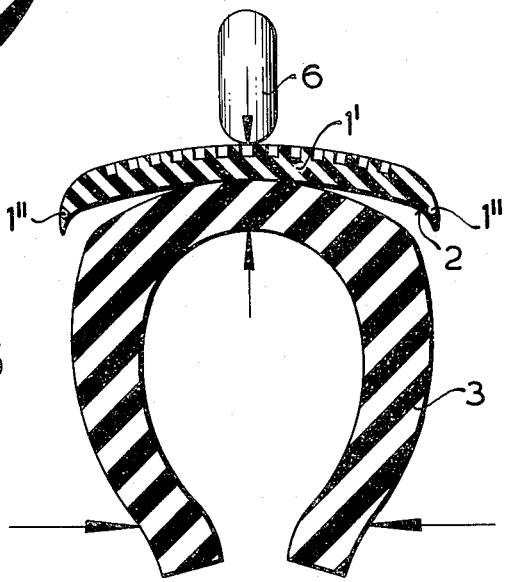
FIG. 5 is a sectional view through another carcass and tread strip with the latter being pressed onto the carcass.

FIG. 5 illustrates one manner of applying the tread strip to the carcass according to the invention. The radially innermost portions of the carcass 3 are pressed together, as indicated symbolically by the horizontal arrows, so that the outer peripheral surface of the carcass becomes markedly arched. Because of this arching, when the tread strip 1' is first laid onto the outer surface of the carcass, the strip 1' will actually contact the carcass only along the central portion of the outer surface of the carcass. Applied to the underside of the tread strip 1' is a bonding substance which, in conventional manner, effects a permanent bonding of the tread strip to the carcass when the bonding substance is sufficiently heated. The bonding substance may for instance be, or include as its principal component, unvulcanized rubber. However, it is characteristic of the present invention that the bonding substance, before it is heated to effect the conventional permanent bonding, already has sufficient adhesiveness to temporarily bond the tread strip to the carcass, prior to the subsequent vulcanization. Furthermore, it is important that the bonding substance, before the permanent-bonding step, be sufficiently plastic that when the strip 1' is pressed onto the outer surface of the carcass 3, the bonding substance 2 will intimately contact the facing surfaces of the tire carcass and the tread strip. For instance, if one or both of these facing surfaces have surface roughnesses, or have been deliberately roughened, the bonding substance should be sufficiently plastic to completely fill depressions in these facing surfaces.

These conditions having been stated, the important step of removing air from between the strip 1' and the outer surface of carcass 3 is performed as follows.

As already mentioned, the tread strip 1' is initially permitted to contact the outer surface of carcass 3 only along a very limited median circumferential region of the outer surface of the carcass. The aforementioned plasticity and adhesiveness of the bonding substance 2 will cause the strip 1' to become temporarily, but rather firmly bonded to the carcass along this limited portion of the outer surface of the carcass. A pressure roller 6 serves to press the tread strip 1' upon the carcass at this narrow region with sufficient force to cause the plastic—i.e., somewhat flowable—bonding substance to intimately contact the facing surfaces of the tread strip 1' and carcass 3 at this limited region. The pressure of roller 6 will be resisted by some suitable counter-force, symbolically indicated in FIG. 5 by the upwardly pointing arrow; for instance a counter roller like roller 7 of FIG. 3 can be employed.

Importantly, the pressure exerted by roller 6 will force out any air present between the carcass and tread strip at the limited region of contact. The air in question may be air actually present in the binding substance, or else the air present in the surface depressions of one or both of the facing surfaces of the strip and the carcass.

If, for example, the bonding substance is or is composed mainly of unvulcanized rubber, then the temperature of the bonding substance prior to vulcanization will be about 50°–70°C so that it will have sufficient adhesiveness to effect the temporary bond and so that it will have the required plasticity when the tread strip is pressed onto the carcass with a pressure of, for example, about 10 kg/cm². To increase the plasticity of the unvulcanized bonding layer, an evaporable softener such as benzene can be employed. A bonding layer having adhesiveness appropriate for the method of the invention may for example include 3 to 10 parts of resinous material. If it is desired to incorporate a vulcanization accelerator in the bonding substance, one such accelerator that can be used would be the zinc salt of dithiocarbamic acid. An accelerator solution would for example be a solution of 100 volume-parts benzene, 2–3 parts of double salts of zinc-N-ethylphenyldithiocarbamate and cyclohexylethylamine, and 1.5 to 3 parts of sulfur.

The tire is turned and the pressure roller 6 rolls around this median circumferential portion of the tire so that the strip 1' is temporarily bonded to the carcass all around the carcass at this limited region, and so that this limited region is free of air inclusions. During continued turning of the tire, the pressure roller 6 is shifted back and forth in axial direction—i.e., in direction parallel to the axis of the tire—so that the tread strip 1' is temporarily bonded to the outer surface of the carcass at an increasingly wider circumferential region of the carcass. The plasticity of the bonding substance prior to permanent bonding, combined with the lateral movement of the pressure roller 6, forces air or other entrapped gases laterally out from between tread strip 1' and the outer surface of carcass 3. When this part of the process has been completed, tread strip 1' will be temporarily bonded to the outer surface of carcass 3 along the entire underside of the tread strip, and there will be no gas inclusions between the tread strip and the outer surface of the carcass.

It is important to appreciate that this exclusion of air and other gaseous matter depends on three factors. Firstly, the plasticity of the bonding substance makes it possible to "squeeze out" any air inclusions actually within the bonding substance, and makes it possible to fill in all surface depressions in the carcass and tread strip such as might otherwise entrap air or other gaseous matter. This is in contrast to the approach of the prior art. In the prior art, the bonding substance, for instance unvulcanized rubber, was not applied in a sufficiently plastic condition prior to the vulcanization to permit this manner of gas exclusion. In the prior art, the removal of gas from between the tread and carcass—for instance the removal of gas entrapped in depressions in the surface of the tread and carcass, and the removal of gas entrapped in air-gaps between the binding layer and carcass—could only be performed by positively evacuating the gaseous material, either by force of suction, or by retreading the carcass in an evacuated chamber.

Secondly, the novel method of gas exclusion depends on the adhesiveness of the binding substance, i.e., the ability of the binding substance to temporarily bond the tread strip to the carcass prior to the permanent heat-bonding step—i.e., prior to the vulcanization for example. If the bonding substance were not sufficiently adhesive to temporarily bond the tread strip to the carcass, then, as the pressure roller is shifted in direction axially of the tire, those limited middle portions of the strip 1' and carcass 3 which had just been temporarily bonded would soon separate, permitting air to re-enter between them. Thus, it is important for the invention to use a bonding substance which, at least during the time prior to and during the early stages of the permanent heat-bonding, has adhesive characteristics.

Thirdly, the sequence in which portions of the tread strip are permitted to contact the outer surface of the carcass, is important. It is considered particularly advantageous to initially press the median circumferential portion of the tread strip against the median circumferential portion of the outer surface of the carcass, and then to press together the laterally more outward portions of the tread strip onto the carcass-so as to force the entrapped gases laterally outwards from between the strip and the carcass around the entire outer circumference of the carcass. However, it is also possible, for example, to effect this outwards "squeezing out" of gases not around the entire circumference of the tire, but instead at successive angular sectors of the tire. A large number of variations in the sequence in which gas is squeezed out is possible, and it is not believed necessary to enumerate them all.

In FIG. 5, just discussed, the outer surface of the carcass 3 was made to "arch" by compressing the radially innermost portions of the carcass, as indicated by the horizontal arrows in FIG. 5. Thus, the sequence of contact between carcass and tread strip could be carefully controlled. Another of the many alternative expedients encompassed within the concept of the invention is depicted in FIG. 3.

Figure 3:
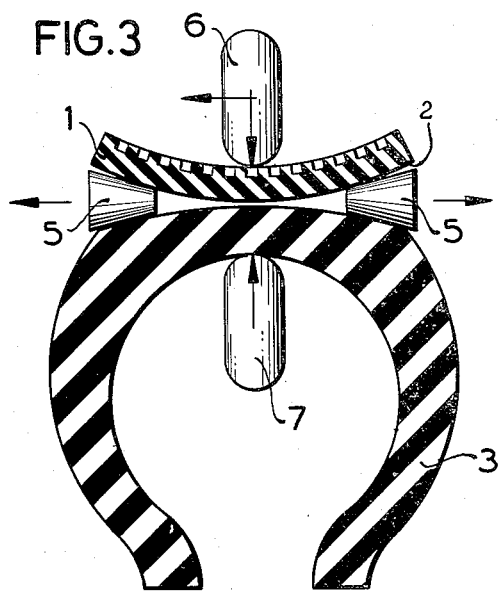
FIG. 3 is a sectional view through a tire carcass during the temporary bonding to the carcass of the new tread material.

In FIG 3 the outer surface of the carcass 3 is not made to "arch" as in FIG. 5. Instead, conical rollers 5 are provided to positive0ly prevent contact between the tread strip 1 and the outer surface of the carcass 3 at the laterally outermost regions of the tread strip. It should be understood that conical rollers 5 are depicted merely for purposes of illustration, and that a practical device for controlling the laying on of the tread strip might employ entirely different means for positively preventing premature contact between the tread strip and the outer surface of the carcass. As before, a bonding substance 2 is applied to the underside of tread strip 1, and this bonding substance must, prior to the subsequent permanent heat-bonding, be sufficiently adhesive to effect a temporary bond between the tread strip 1 and the outer surface of the carcass. Likewise as before, the bonding substance, prior to the subsequent permanent heat-bonding, must be sufficiently flowable to completely fill in all surface depressions in the facing surfaces of the tread strip and the carcass, to thereby displace any gases entrapped in such surface depressions. As was the case in FIG. 5, a pressure roller 6 in FIG. 3 effects temporary bonding of the median circumferential portion of the strip 1 to the median circumferential portion of the carcass, with consequent expulsion of air from between these portions; and then the roller 6 proceeds to effect temporary bonding of and exclusion of gases from between successive lateral circumferential portions of the tread strip and carcass. Thus, again, gases are forced out laterally. Pressure roller 6 applies pressure against the resisting force of a counter-roller 7, and both rollers 6 and 7 are to be understood as being only symbolic of suitable pressure-applying means whose provision is well within the skill of mechanics in this and similar fields of endeavor.

The method steps thus far described relate only to the temporary bonding of the tread strip to the carcass and the expulsion of gases from between the strip and carcass. In actual practice, the described procedure must be modified, because of practical difficulties which arise during the subsequent permanent bonding steps—for example during subsequent vulcanization if the bonding substance consists of unvulcanized rubber.

The adhesiveness of the bonding substance so important for the method may markedly decrease during the course of the permanent heat-bonding step, for instance during subsequent vulcanization if the bonding substance is unvulcanized rubber. Thus, for a period of time, the temporary bonding force which holds the tread strip to the carcass may so greatly decrease that the tread strip begins to detach itself from the carcass during the course of the vulcanization. This tends to happen particularly at the lateral margins of the tread strip. Such detachment is of course intolerable: the tread strip may fail to bond to the carcass altogether in these regions. The region of detachment will constitute an entry point for air, when according to the invention the vulcanization is performed under ordinary atmospheric conditions. And there is a considerable tendency of the heated bonding substance to flow before setting and escape from between the tread strip and carcass.

Therefore, according to the invention, measures must be taken to prevent such detachment, and in particular to prevent such detachment at the lateral margins of the tread strip. Various such measures are contemplated.

It is contemplated, as one possibility, to effect a preliminary cross-linking, e.g., vulcanization, at the marginal portions of the tread strip in advance of the vulcanization of the remainder of the bonding layer. This expedient prevents detachment of the tread strip at its lateral margins. Furthermore, such preliminary cross-linking tends to maintain the tread strip in place on the carcass during the initial softening and loss of adhesiveness of the bonding layer during the course of the vulcanization. Also, such prelimanary cross-linking prevents the escape from between the tread strip and carcass of the bonding substance, for instance unvulcanized rubber, which latter becomes rather flowable during the initial phase of the vulcanization.

Figure 6:
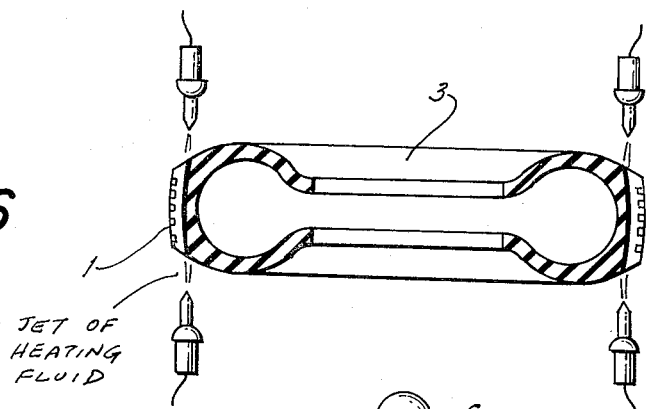
FIG. 6 depicts schematically one manner of effecting vulcanization of the marginal portions of the bonding layer in advance of the central portion thereof.

This earlier cross-linking at the marginal zones of the tread strip can be effected, for example, by subjecting this region of the retreaded tire to an intense and localized preliminary heating, for instance by directing a stream of superheated air or steam, or another gas, against this portion of the retreaded tire as schematically depicted in FIG. 6. Self-evidently, the temperature of such stream of hot gas and the length of application and other such factors will depend on the materials employed.

However, as examples of this sort of expedient, it is advantageous to direct against the marginal portions of the tread strip a stream of hot glycerine, or to heat these marginal portions by electrical or electromagnetic means.

Furthermore, it is contemplated that the pressure rollers which apply the tread strip to the outer surface of the carcass prior to vulcanization may themselves be heated to high temperatures, and it is another possibility according to the invention to have such heated rollers effect, or at least cooperate in the preliminary cross-linking and sealing of the lateral margins of the tread strip to the shoulders of the carcass.

A related possibility is to use heated rollers in combination with blasts of hot gases or steam.

Still a further possibility is to provide a bonding substance which varies in composition in direction axially of the tire. For instance, it is considered advantageous if the composition of the bonding layer near the margins of the tread strip be such that, during the vulcanization, cross-linking will be effected at such marginal portions in advance of the greatest loss of adhesiveness of that portion of the bonding layer nearer the center of the outer surface of the carcass. Such an effect is equivalent to stitching the lateral margins of the tread strip to the shoulders of the carcass to prevent flowing out of the softened bonding layer.

In the event that the method according to the invention is used to apply a circumferentially complete tread-strip ring to the outer surface of a tire carcass, then it is advantageous that the tread-strip ring be stretched so that its inner circumference is greater than the outer circumference of the carcass during the initial part of the process, so that the tread strip can be permitted to come into contact with the outer surface of the carcass in the controlled, sequential manner important for the invention. However, the invention can be performed without stretching of such a circumferentially complete tread-strip ring, if suitable means are provided to limit and control the sequence of contact between the facing surfaces of the tread strip and carcass.

It has already been explained that according to the invention it is possible to avoid the prior-art practice of encasing the tread strip and carcass in a sealed jacket from which the air is evacuated. However, it is nevertheless also contemplated or retread tires using a combination of the air-exclusion method of the invention and the vacuum chamber method of the prior art. For example, it is advantageous to temporarily bond the tread strip to the outer surface of the carcass by means of the adhesive and plastic bonding layer in the manner already described. However, instead of then initiating the vulcanization or the preliminary cross-linking of the lateral margins of the tread strip, it is advantageous to encase the temporarily bonded assemblage in an evacuation chamber, of the type known in the prior art, for the purpose of further expulsion of gas inclusions not already expelled. The evacuation jacket can also be designed to prevent escape of softened bonding substance during the initial phase of the subsequent vulcanization, by the simple expedient of exerting a mechanical force on the lateral margins of the tread strip such as will effect a temporary seal.

Figure 2:
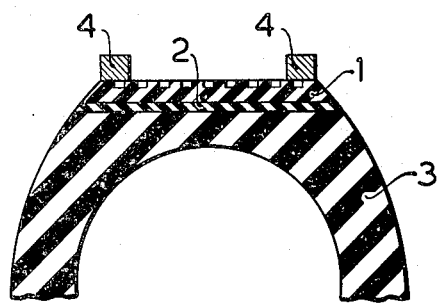
FIG. 2 is a sectional view through another such tire.

As a further possibility, shown in FIG. 2 of the drawing, retaining rings may be wound, or otherwise, emplaced about the circumference of the retreaded tire and made to firmly hold down the lateral margins of the tread strip during the vulcanization. These rings may be metallic wires, rubber cables or rings, or be of another suitable configuration.

It has already been stated that it is advantageous if the composition of the unvulcanized bonding layer is such that cross-linking in the region of the lateral margins of the tread strip occurs substantially in advance of the maximum softening of the middle portion of the bonding layer during the course of the vulcanization. One advantageous way of ensuring this sequence of events is to incorporate a crosslinking accelerator into the bonding layer at the region thereof near the lateral margins of the tread strip. As already explained, this will prevent escape of the softened bonding rubber during the initial stage of the vulcanization.

FIG. 4 illustrates a variation of the method according to the invention. In FIG. 4 the tread strip 1 is applied to the outer surface of carcass 3, as in the other embodiments. However, in FIG. 4, a layer of unvulcanized bonding rubber 2 is applied to both the underside of the tread strip 1 and the outer surface of the carcass 3. The roller 8 serves the dual purpose of guiding the tread strip 1 onto the outer surface of the carcass and simultaneously pressing the tread strip onto the carcass. Advantageously, the angle of approach of the tread strip 1 to the circumference of the carcass is substantial, here 90°. The pressure exerted by roller 8 will force air out from between the tread strip and the outer surface of the carcass as indicated schematically by the arrow, and the 90° angle of approach illustrated will permit the freest possible escape of expelled gases. As in the other embodiments, the bonding substance 2 should be sufficiently adhesive to effect a temporary bonding of the tread strip to the carcass, and should be sufficiently plastic — i.e., sufficiently flowable under the pressure exerted by roller 8 — to ensure that the bonding substance intimately contacts the facing surfaces of tread strip and carcass and completely fills any surface depressions in those facing surfaces.

A further possibility according to the invention is shown in FIG. 5, to which reference was made earlier. The tread strip 1' shown in FIG. 5 has marginal portions 1'' which are bent downwardly, so as to be able to tightly engage the radially outermost portions of the side walls of the carcasses. For the reasons already described in the discussion of FIG. 5, the radially innermost portions of carcass 3 are compressed as indicated by the horizontal arrows, to exaggerate the convexity of the radially outermost surface of the carcass. On the one hand, this exaggerated convexity permits control of the contact between the tread strip and the outer surface of the carcass; on the other hand, the axial compression of the carcass narrows the axial thickness of the radially outermost portion of the carcass making it possible to insert the carcass between the gripping marginal portions 1'' of the tread strip.

Figure 1:
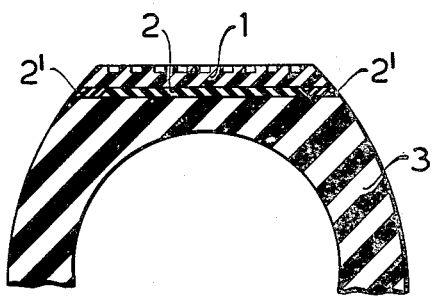
FIG. 1 is a sectional view through a retreaded tire according to the invention, prior to the vulcanization step.

FIG. 1 shows a possibility according to the invention whereby the radially innermost portions of the carcass 3 are spread in axial direction, so that the radially outermost surface of the carcass is forced to lie substantially in a single plane. The bonding layer 2 is vulcanized onto the outer surface of carcass 3, prior to the permanent bonding of the tread strip to the carcass. The axially outermost portions of the bonding layer 2 are designated 2' and consist of a rubber composition which cross-links considerably faster than the middle portions of the bonding layer.

Figure 7:
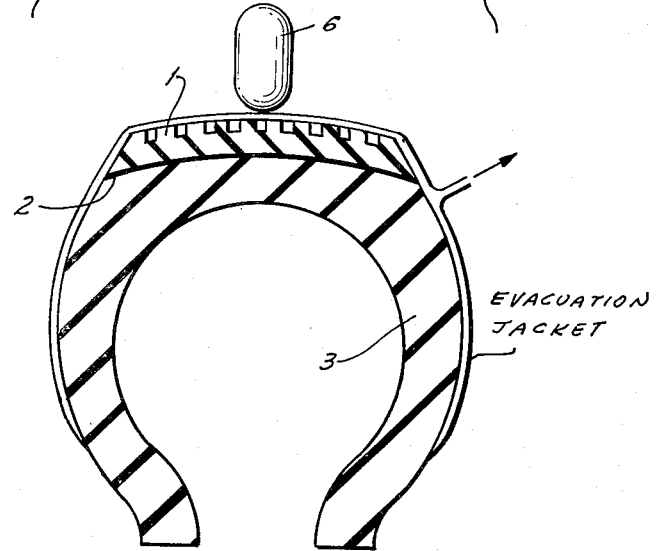
FIG. 7 schematically depicts the application of a tread strip to a carcass in an evacuation chamber formed by an evacuation jacket.

FIG. 7 schematically depicts the application of the tread strip to the carcass in an evacuated chamber.

Figure 8:
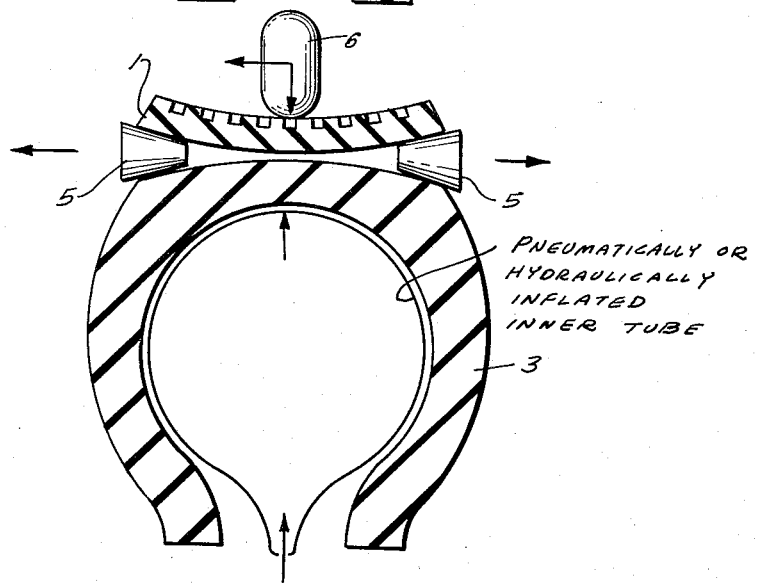
FIG. 8 depicts a modification of the arrangement shown in FIG. 3.

FIG. 8 schematically depicts the use of an hydraulically or pneumatically inflated inner tube in place of the inner roller 7 of FIG. 3.

I claim:

1. A method of retreading tires, comprising, in combination, the first step of positioning a tread strip in proximity to the outer periphery of a tire carcass; the second step of providing intermediate said carcass and said strip an unvulcanized adhesive bonding layer; the third step of effecting temporary adhesive bonding of said strip to said carcass by pressing said strip and said carcass together with a pressure sufficient to cause the material of said bonding layer to enter into and completely fill all the surface depressions in the facing surfaces of said strip and of said carcass and to completely fill the space intermediate the facing surfaces of said strip and of said carcass; and the fourth step of effecting permanent bonding of said tread strip to said carcass by effecting vulcanization of said bonding layer by heating and without any holding wrapper or holding form, including effecting vulcanization of the marginal portions of said layer in advance of vulcanization of the central portion of said layer by first heating to the vulcanization temperature said marginal portions and thereafter heating to said vulcanization temperature the central portion of said layer, so that the decrease in adhesive force of said central portion resulting during heating of the latter is delayed until after the vulcanization of said marginal portions has been substantially completed, whereby during the course of the vulcanization of the entire bonding layer the total adhesive force exerted by said layer will be sufficient to hold said tread strip in place on said carcass without the need for a holding wrapper or holding form.

2. A method as defined in claim 1, wherein said third step comprises initially holding the entire tread strip out of contact with said carcass, and thereafter successively pressing into contact with said carcass successive adjacent limited portions of said strip while continuing to hold all but the previously pressed limited portions of said strip out of contact with said carcass to thereby effect a gradual enlargement of the portion of said strip which has been pressed into contact with said carcass, and during the pressing of each such successive adjacent limited portion of said strip pressing such limited portion onto said carcass with a pressure sufficient to cause the material of said layer intermediate such limited portion and the facing surface portion of said carcass to enter into and completely fill all the surface depressions in the surface of such limited portion and in the facing surface portion of said carcass and to completely fill the space intermediate such limited portion and the facing surface portion of the carcass to thereby drive out all gas inclusions from between such limited portion and the facing surface portion of the carcass, whereby to effect a gradual enlargement of the region between said strip and said carcass from which gases have been expelled and at which said strip and said carcass are temporarily bonded together by said unvulcanized adhesive bonding substance.

3. A method as defined in claim 2, wherein said first step comprises forming at least one tread strip into a ring surrounding the outer peripheral surface of said carcass, and wherein said successive adjacent limited portions of said strip are axially adjacent limited circumferential portions of said strip.

4. A method as defined in claim 3, wherein said third step comprises initially pressing onto said carcass the middle ones of said circumferential portions of said strip and successively thereafter the axially more outwardly located ones of said circumferential portions, whereby to laterally expel gases from between said strip and said carcass.

5. A method as defined in claim 2, wherein said successive adjacent limited portions are the circumferentially successive portions of the tread strip.

6. A method as defined in claim 1 and further including the step of preventing during said fourth step detachment of the marginal portions of said strip from said carcass by mechanically pressing said marginal portions against said carcass during said fourth step.

7. A method as defined in claim 1; and further including the step of compressing in axial direction the radially innermost portions of said carcass to thereby increase the convexity of the radially outermost peripheral surface of said carcass.

8. A method as defined in claim 1; and further including the step of spreading the radially innermost portions of said carcass apart in direction axially of said carcass and in a sense decreasing the convexity of the radially outermost peripheral surface of the tire, to facilitate the pressing of said tread strip onto said outermost peripheral surface.

9. A method as defined in claim 1, wherein at least said third step is performed in an evacuated chamber.

10. A method as defined in claim 2, wherein said holding out of contact is effected by inserting conical rollers between the carcass and the marginal portions of said strip, and wherein the pressing onto said carcass of said strip is effected by a roller which shifts in direction axially of the carcass.

11. A method as defined in claim 10, wherein said conical rollers are withdrawn when said pressure roller approaches the respective marginal portion of the tread strip.

12. A method as defined in claim 1, and further including the step of exerting from within said carcass an outwardly directed force resisting the force with which said strip is pressed onto said carcass.

13. A method as defined in claim 12, wherein said outwardly directed force is pneumatic or hydraulic.

14. A method as defined in claim 1, wherein said second step comprises applying a layer of bonding substance to each of the facing surfaces of said tread strip and said carcass.

* * * * *